CAPACITIVE COMMUTATOR TRANSMITTER

Filed Dec. 22, 1950 3 Sheets-Sheet 1

INVENTOR
N. D. NEWBY
BY R. O. Covell
ATTORNEY

INVENTOR
N. D. NEWBY
BY R. O. Covell
ATTORNEY

Feb. 1, 1955 N. D. NEWBY 2,701,357

CAPACITIVE COMMUTATOR TRANSMITTER

Filed Dec. 22, 1950 3 Sheets-Sheet 3

INVENTOR
N. D. NEWBY
BY
R. O. Covell
ATTORNEY 2,701,357

CAPACITIVE COMMUTATOR TRANSMITTER

Neal D. Newby, Leonia, N. J., assignor to Bell Telephone Laboratories, Incorporated, New York, N. Y., a corporation of New York Application December 22, 1950, Serial No. 202,217

15 Claims. (Cl. 340—364)

This invention relates to signaling systems and particularly to systems in which selective signals are transmitted by coded electrical current impulses.

Objects of this invention including the rapid transmission of selective signals consisting of electrical current waves representing coded impulses and simplification of the apparatus required for transmitting such signals.

In signaling systems arranged to transmit signals consisting of groups of waves representing coded electrical current impulses it is known to employ an electrostatic commutator for scanning the registers on which the signals to be transmitted are registered according to a predetermined code, one such system being disclosed in application Serial No. 186,932 by H. E. Vaughan, September 27, 1950, now Patent 2,678,435, granted May 11, 1954. The signal transmitter in the Vaughan application comprises a single mechanically driven capacitor plate which is used to scan a plurality of fixed capacitor plates, certain of which are marked by a voltage of a given frequency under control of an associate digit register, said voltage being generated by an auxiliary oscillator circuit. The voltage impulses produced on the scanning plate by continuous scanning of the fixed plates constitute code modulated signals which are amplified and transmitted over a line to an appropriate signal receiver.

The present invention provides a signal transmitter comprising an electrostatic commutator for scanning the registers on which signals to be transmitted are registered according to a predetermined code. A feature of this invention is a signal transmitter consisting of a single mechanically driven disk having a plurality of capacitor plates thereon which is used to scan simultaneously a plurality of stationary capacitor plates, certain of which are marked by a direct-current voltage under control of an associated digit register. The stationary and the rotating capacitor plates are of such relative size and shape that the output voltage produced on the rotating plates will be a group of waves of a particular frequency, or a multiple of frequencies and having an envelope of a particular desired wave form, determined respectively by the shape of said plates and by the speed at which said rotating plates are moved. This generation of an alternating voltage in an exemplary embodiment may be accomplished by shaping the stationary plates so as to resemble the envelope of a carrier wave modulated by a sine wave, the scanner being a thin uniform plate or a plurality of thin plates. The output does not consist of a carrier wave modulated by a sine wave but, on the other hand, consists of a sine wave itself, the only modulation being interruption of the wave to form groups of waves representing discrete signal pulses, that is, a signal pulse modulated wave; however, the head and tail of a group of waves may be modified to reduce interference, this being sometimes referred to as reducing or eliminating the so-called direct-current component. In a broad sense, this shaping may be considered modulation but is not so referred to herein. Because the capacity between said electrodes varies as the shape of the fixed plate, the voltage produced fluctuates in a like manner thereby generating a group of waves, or more generally, groups of several waves of different frequencies selected code-wise which may be amplified and transmitted over a line or trunk to a distant signal receiver. It may be noted that this method of generating waves modulated or varied in accordance with signal impulses results in considerable economy in multi-frequency signaling through the replacement of an oscillator by a single shaped plate signal generator for each frequency to be transmitted and, consequently, therefore, for transmitting eight frequencies the elimination of the eight oscillators heretofore required for similar purpose is accomplished.

Another feature of this invention is the shaping of the signal envelope so as to minimize the direct-current component of the generated signal without the use of any shaping networks whatsoever thereby economizing in the use of apparatus. This so-called direct-current component is an expression somewhat loosely employed by engineers with reference to a slower variation of current corresponding to the frequency at which the one or several impulse groups are transmitted over the line. When a group of waves representing an impulse is started and stopped an impulsive disturbance is created and impressed upon the outgoing line. Such an impulsive disturbance has inherent in it frequency variations which cover a wide frequency range and which differ in amplitude, phase and number according to the suddenness of starting and stopping the wave group. As is well known these frequency variations cause undesirable transients in those band-pass filters in the receiver which are tuned to other frequencies.

As shown in the works of Nyquist and others these disturbances may, in some cases, be manifested in the time interval of adjacent groups of waves of the same frequency as well as in the frequency range of other frequencies; in general, their detrimental effect may be eliminated by shaping.

A further feature of this invention is a testing system wherein additional test signal waves of given frequency representing test pulses are generated whenever the commutator is in operation. These test signals may be transmitted continuously when a given signal channel is in operation and may be selectively received through a band-pass filter or other device to actuate a buzzer or other signal indicating device. If for some reason the commutator should cease to operate properly a warning signal will be given to indicate the non-reception of the test signals as evidence of improper operation in the sending device.

These and other features of the invention will be better understood from the following detailed description made wtih reference to the accompanying drawings in which.

Figure 11:
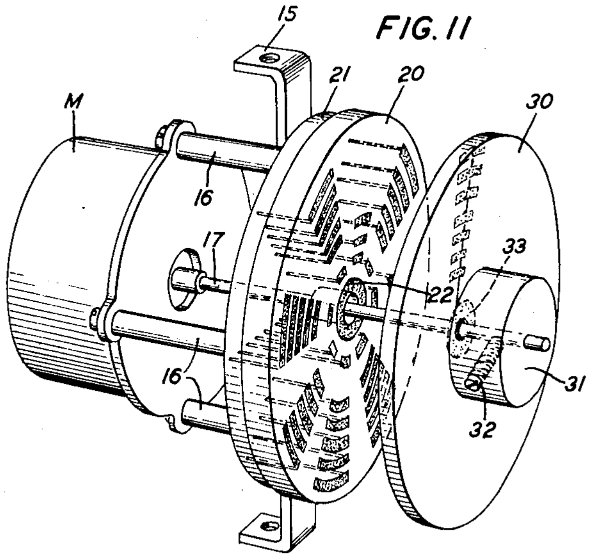
Figure 13:
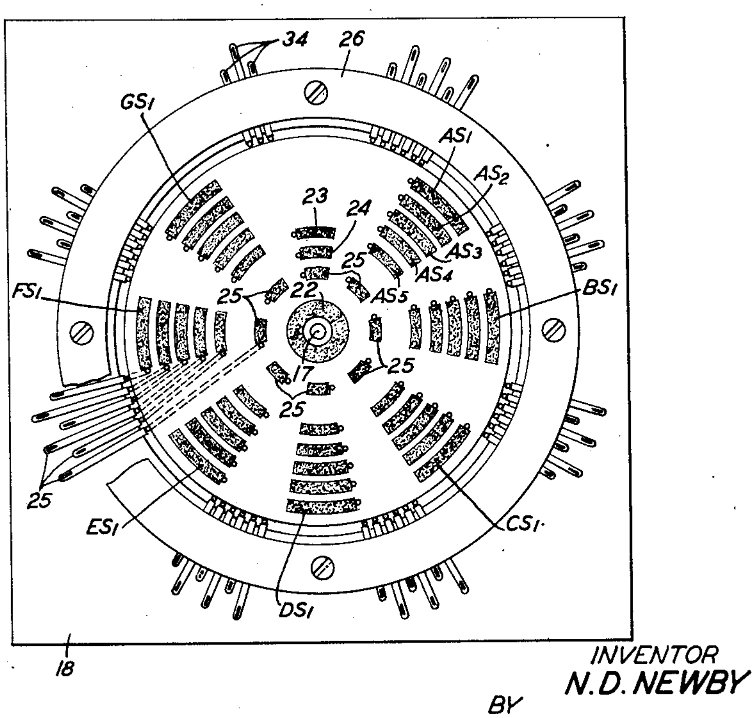

As shown in Fig. 11, the scanner comprises a motor M, two circular disks 20 and 30 of insulating material, such as glass, which together with mounting bracket 15 form a demountable unit. The motor M is a synchronous motor of known design connected to a 110-volt power source, not shown, and properly geared so as to rotate disk 30 at a predetermined speed hereinafter described. Disk 20 is approximately 12 inches in diameter and is cemented to a metal supporting plate 21 which is secured to the motor housing by lugs 16. Shaft 17 of motor M, which rotates disk 30, extends through a small opening at the center of disks 20 and 21. Rotating disk 30, which is the same diameter as disk 20, has a hub 31 of like material integral therewith or cemented thereto and is fixed on the free end of motor shaft 17 by means of set screw 32 inserted in hub 31. Fig. 13 shows a horizontally disposed mounting board 18 mounted on a supporting frame, not shown. Board 18 has a circular hole in the center into which stationary disk 20 is positioned flush with the top of said board. Mounting bracket 15 is also fastened to the frame which supports mounting board 18.

Figure 12:
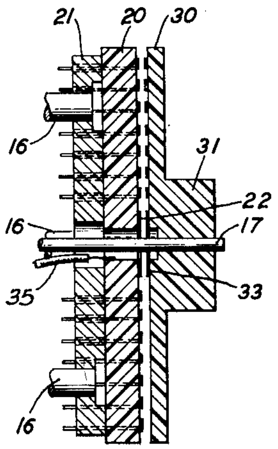
Figs. 11, 12 and 13 show details of the structure of the capacitive scanner.

The stationary disk 20 carries on its surface opposing rotating disk 30 a hub capacitor plate 22, start signal capacitor plates 23 and 24, eight test signal capacitor plates 25, and a plurality of code capacitor plates. The code capacitor plates are designated $AS_1$–$AS_5$, $BS_1$–$BS_5$, $CS_1$–$CS_5$, $DS_1$–$DS_5$, $ES_1$–$ES_5$, $FS_1$–$FS_5$ and $GS_1$–$GS_5$ to represent the seven digits being transmitted in the particular embodiment illustrated in Figs. 1, 3, 11 and 13. Each digit in turn contains five plates, for example, $AS_1$, $AS_2$, $AS_3$, $AS_4$ and $AS_5$, each adapted to generate a designated frequency when scanned by the rotating plate. The hub capacitor plate 22 is approximately one inch in diameter and extends down into the center hole through which shaft 17 passes and enables connection of conductor 35 as shown in Fig. 12. The various capacitor plates on disk 20 may be formed thereon by any of several methods known in the art under the generic phrase "printed circuits." Circuits are defined as being "printed" when they are produced on an insulated surface by any of several processes. The methods of printing circuits generally fall into six classifications: painting, spraying, chemical deposition, vacuum processes, dye-stamping and dusting. For a detailed description of these various processes reference is made to the following articles published by the United States Department of Commerce: "Printed Circuit Techniques," National Bureau of Standards Circular 468, November 15, 1947, and "New Advances in Printed Circuits," National Bureau of Standards, Miscellaneous Publication 192, November 22, 1948.

The rotating disk 30 carries on its surface a hub capacitor plate 33 opposing hub capacitor plate 22 on disk 20, and a scanning capacitor plate R comprising electrically connected segments $R_1$, $R_2$, $R_3$, $R_4$, $R_5$, $R_6$ and $R_7$ adapted to successively oppose the capacitor plates formed on stationary disk 20. The capacitor plate segments on disk 30 are formed in a manner similar to that by which the capacitor plates are formed on disk 20, as above described. Segments $R_1$ through $R_7$, in addition to being electrically connected to one another, are electrically connected to hub plate 33 by a thin line of conducting material formed on disk 30. The opposing surfaces of disks 20 and 30 are machined as accurately as is reasonably possible in planes perpendicular to shaft 17, and the running clearance between the opposing surfaces of disks 20 and 30 is kept as small as possible, i. e., in the magnitude of .003 inch. In Fig. 11 disk 30 is represented as being about one inch from disk 20. However, this separation in the drawing has been made for the purpose of more clearly illustrating the structure of the scanner.

Figures 1, 2:
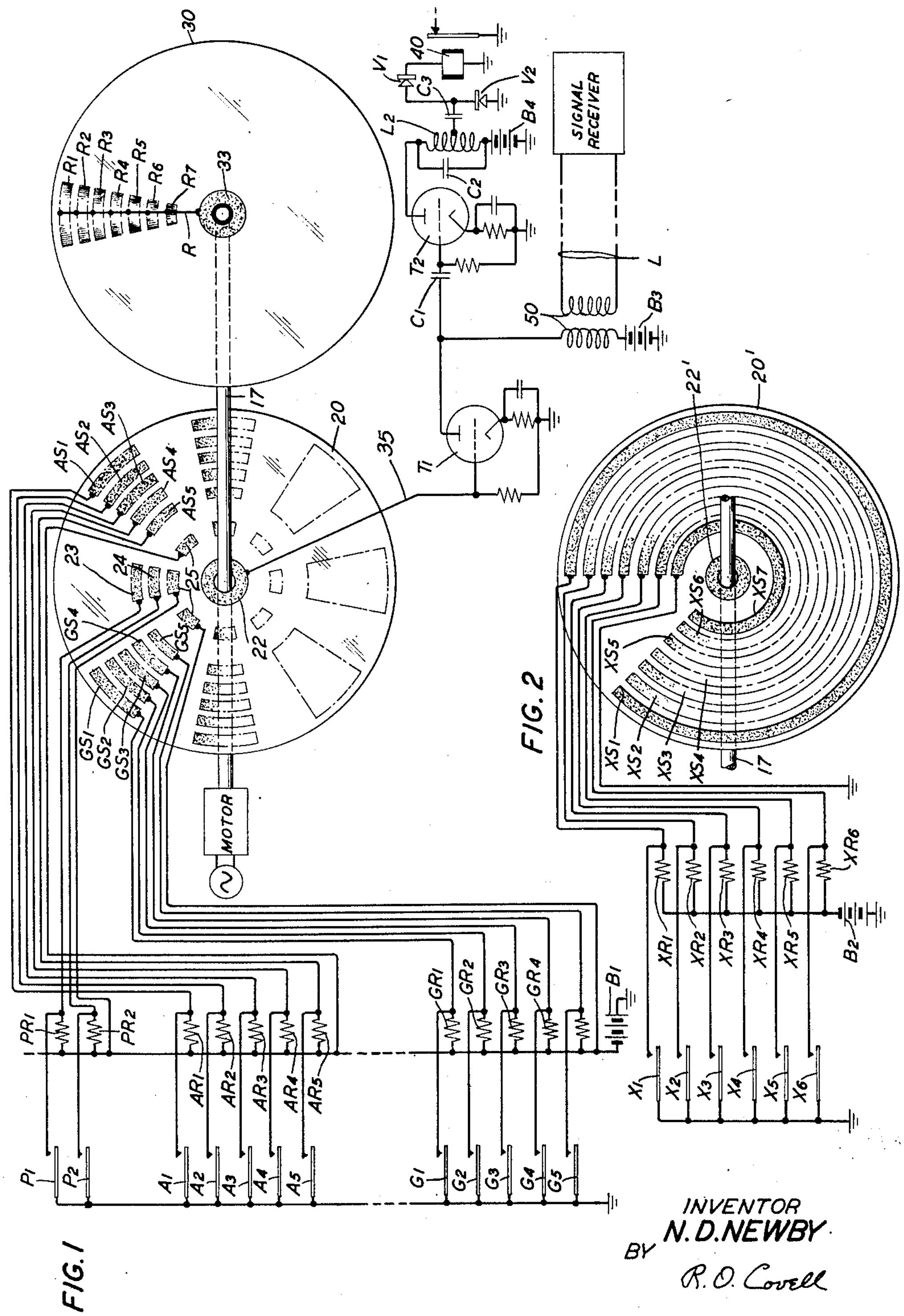
Fig. 1 represents schematically the registers on which the digital information is stored, a capacitive scanner and an amplifier-test circuit.
Fig. 2 represents an optional arrangement for storing coded information on the capacitive scanner.
Figure 5:
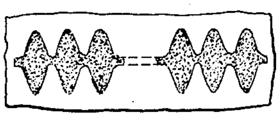
Figs. 5, 6 and 7 show modifications of electrode design for the stationary disk of the capacitive scanner.
Figure 6:
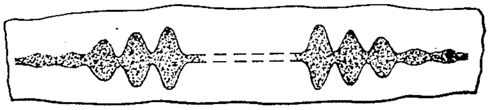
Figure 7:
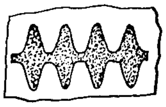

The capacitor plates formed on disk 20 are shown in Figs. 1, 11 and 13 as occupying approximately rectangular segments of the circle. This has been done to simplify the schematic drawings which merely illustrate the location of said plates on the disk. Actually each segment as shown represents only the envelope of the actual electrode structure which is illustrated in greater detail in Figs. 5, 6 and 7. In order to simplify these drawings the detail structures shown in Figs. 5, 6 and 7 are shown as linear arrays. For the purpose of the description that follows it will be assumed that the scanning electrodes consist of a single plate of negligible width. Thus it can be seen that as a rotating plate is brought into spaced relationship with a stationary plate, a condenser is formed therewith. As this rotating plate moves past the stationary plate the capacitance of said condenser varies directly as the width of the stationary plate and at a rate which is a function of the speed of the rotor and the variation in width, if the rotating plate is of uniform width. If the leakage capacitance is negligible a potential will be induced on the rotating plate which also varies directly as the variation in capacity between the plates, assuming also that a constant voltage is supplied to said stationary plate. The alternating-current voltage is thus generated across the plates of these condensers; therefore the condensers act as a source of driving voltage for the outgoing line. However, since the scanning plate must have a definite width and all leakage capacitance cannot be eliminated, the use of a plate having a shape similar to that shown in Fig. 7 will be required in order to generate a sinusoidal voltage. The frequency of the signal wave produced is determined by the number of lobes on the stationary plate scanned by the rotating plate in a given time interval. For example, if one hundred lobes are passed in one second the generated pulse will have a frequency of one hundred cycles per second. In the preferred embodiment of the present invention the generated signal is removed from stationary disk 20 rather than from rotating disk 30. This is accomplished by means of the condenser formed with the hub capacitor plates 22 and 33. Since the rotating electrodes are electrically connected with plate 33 the generated signal will be applied to plate 33 which in turn produces a signal on plate 22, the latter being directly connected to the output amplifier $T_1$.

Figure 4:
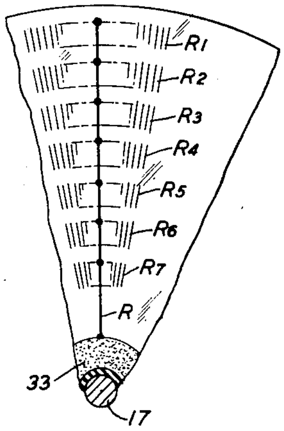
Fig. 4 shows in detail the electrode arrangement on the rotating disk of the capacitive scanner.
Figure 8:
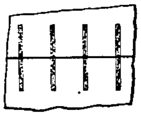
Figs. 8, 9 and 10 show modifications of electrode design for the rotating disk of the capacitive scanner.
Figure 9:
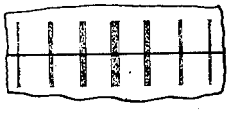

The plate structure so far described with particular reference to Fig. 5 will generate alternating-current signals having essentially a square envelope. Such signals, however, cause undesirable transients in those band-pass filters in the receiver tuned to other frequencies. The presence of such transients delays the recognition of the signals and increases the cost of the receiver. This objectionable characteristic can, however, be minimized by shaping the stationary plates somewhat as shown in Fig. 6. In this arrangement the end lobes of each stationary plate are smaller in amplitude than those near the center of the group. Hence the sinusoidal variation of the capacitance increases in magnitude as the scanning plate moves towards the center of said stationary plate and decreases as it moves away from the center. In this manner the output wave resulting from a single passage of a scanning plate over a fixed plate consists of a current generally of sinusoidal wave form which builds up gradually to maximum at which maximum it may remain for a suitable number of one or more cycles and then decay gradually. By using various modifications of this sort, the build-up and decay of the signal may be tailored to any desired shape and the two need not be the same. Likewise different shapes as well as different numbers of lobes per given angle of rotation may be used for the various frequencies transmitted in a multifrequency generator. The arrangement thus described lends itself to compensation for variation in time of transmission of different frequencies over a transmission line by differently shaping or locating the beginning and ending of certain plates relative to others whereby the voltage for a wave having a slower time of transmission is commenced slightly sooner than some other wave having a faster time of transmission. In the description thus far, it has been assumed that the rotating electrode consists of a single thin plate of uniform thickness. The output voltage of the scanner can, however, be considerably increased by replacing the single plate by several plates in parallel as shown in Figs. 4 and 8. The spacing between said plates must be identical to that between the lobes of the corresponding stationary elements to prevent phase shift and distortion of the generated signal. A design such as shown in Fig. 8 will provide a linear build-up and decay of the signal if used with the stationary plate of Fig. 7. Still further modification of the build-up and decay time can be obtained with the rotating plate structure shown in Fig. 9, wherein the center segments are progressively wider than those on either end, resulting in a larger capacitance being formed as the center portion scans the stationary plates.

Figure 10:
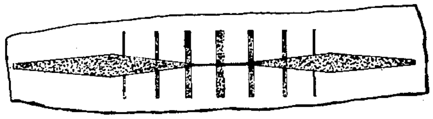

The output voltage of this scanner structure unfortunately has a direct-current component as well as the alternating-current component. Electrode shaping which produces gradual build-up and decay of the alternating-current component, above described, also provides similar control of the direct-current component which in general should be satisfactory for multifrequency signaling. However, if it is found that the transients in the direct-current components are still too high in frequency and amplitude they may be further reduced by the artifice illustrated in Fig. 10. The structure in Fig. 9 has therein been modified by the addition of diamond-shaped segments extending beyond the plate segments so that the build-up of the direct-current components begins before the generation of the alternating-current voltage and is much more gradual. Transients in the direct-current components are in this manner reduced in both frequency and amplitude. These transients may be eliminated entirely by extending the diamond-shaped portion of the rotating plate completely around the rotating disk in the form of a thin band. Hence there is a small capacitance between the rotating and stationary plates at all times, said capacitance resulting in a steady direct-current signal in the output. Optionally this addition might have been made in a like manner to the stationary plate.

Figure 3:
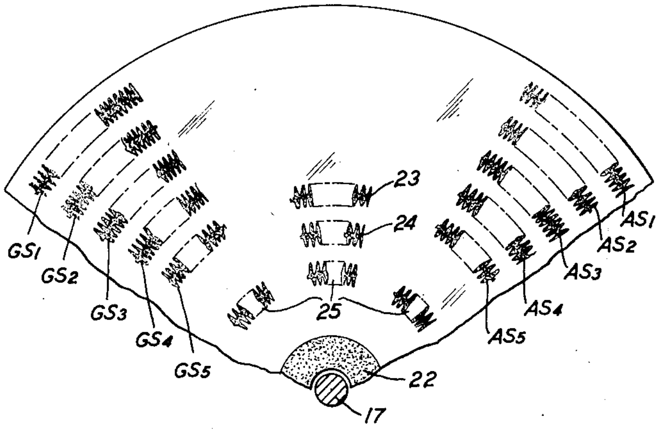
Fig. 3 shows in detail the electrode arrangement on the stationary disk of the capacitive scanner.

As shown in Figs. 1, 3 and 13 the seven groups of code capacitor plates are designated AS, BS, CS, DS, ES, FS and GS corresponding to the seven registers A, B, C, D, E, F and G which store the signals to be transmitted. Each of the seven groups contains five individual plates and each individual plate is designed to generate one of the five designated frequencies. Each digit register in turn contains five separate registers, one for each code plate on the stationary disk. These registers may be of the usual relay storage type, variably actuated by incoming digit signals of any known type, and the relays of each register are arranged when a digit is stored thereon to connect ground to three of the five associated code conductors which connect to code electrode plates in the scanner, the code used being the well-known two-out-of-five type. In Fig. 1 only the first and last of these digit registers, the A register and G register, are shown, each being schematically represented by five contacts which are variably actuated by the relays, not shown, of the register to connect ground through corresponding isolating resistances $AR_1$, $AR_2$, etc. to three of the five conductors which are connected to the corresponding digit code electrode plates of stationary disk 20. The remaining two registers of each group are connected directly to a source of potential, for example, —48 volts of battery $B_1$. The conductors for the A digit register are designated $A_1$, $A_2$, $A_3$, $A_4$ and $A_5$; the conductors for the G register are designated $G_1$, $G_2$, $G_3$, $G_4$ and $G_5$; and the conductors for the five intermediate registers would be correspondingly designated if shown.

In addition to the code electrodes above mentioned there are two start signal plates 23 and 24 and eight test signal plates 25 formed on disk 20. The start signal plates 23 and 24 are connected respectively to contacts $P_1$ and $P_2$ of register P. The start signal contacts are operated in the same manner as the code contacts, the only difference being that two frequencies instead of five are required. As is well understood in code signaling on a two-out-of-five basis each pair of frequencies selected out of the chosen five represents a digit. In the arrangement according to Fig. 1 provision is made for setting up on the registers $A_1$–$A_5$ to $G_1$–$G_5$ a total of seven digits. As is also well known in signaling, allocation of each digit to its correct register at the receiving end may be accomplished by a start signal which prepares the register for registration and thereafter the impulses derived from the transmitted frequencies are steered or otherwise allocated to their proper position of registration. The start signal contacts are thus operated at a proper time in accordance with known practice to energize the start signal plates 23 and 24 and send out ahead of the selective signals proper start signals for preparing receiving apparatus. The test signal plates, on the other hand, are connected to send out their own special test signal frequency at all times at which any other start or signal waves are to be transmitted. The eight test signal plates 25 are directly connected to battery $B_1$ so that a —48 volts potential appears on said plates at all times the scanner is in operation. Whenever the source of voltage $B_1$ is properly applied and the transmitting apparatus is otherwise operating properly, the test signal is generated and transmitted; it is received in receiving equipment hereinafter described in such manner that its non-reception indicates temporary trouble which should be rectified.

While the conductors could be connected to the stationary electrodes in several ways, the arrangement shown in Figs. 11, 12 and 13 is one in which a small hole is formed beside each plate through disks 20 and 21. Bronze springs 25 are fixed in a circle on the face of mounting board 18 and individual conductors connect each plate to an individual spring 34, which are in turn connected to corresponding register contacts. The first-mentioned conductors pass behind disk 20 and through the aforementioned holes in disks 20 and 21. Since disk 21 is formed of metal said conductors must be properly insulated. A ring 26 of insulating material is fastened by screws to board 18 to cover the middle portions of springs 34, the outer ends of which are attached to conductors from the register contacts. The elements 22 and 33 constitute a capacity coupling which tends to reduce the transmission to the outgoing line of spurious currents of undesired frequencies and currents having slow variations and amplitude. The necessity for contacting brushes or other sliding contacts is thereby eliminated which is advantageous because experience shows that such arrangements tend to introduce interfering noise.

Thus for any given registration on the seven-digit transmitter shown in Fig. 1, twenty-one of the code plates of disk 20 are held at ground potential and fourteen of said plates are at the potential of battery $B_1$, —48 volts. The start signal plates 23 and 24 are similarly connected to battery $B_1$ or ground while all eight test signal plates 25 are constantly at battery potential. For a given application of this invention, let it be assumed that the desired frequencies to be transmitted, expressed in cycles per second, are as follows: 1700, 1500, 1300, 1100, and 900. In addition, start signal plate 24 is to generate a 700-cycle per second signal and test signal plates 25 are to generate a 200-cycle per second signal. Let it also be assumed that disk 30 is to be rotated at an angular velocity of one cycle per second. Since the generated frequency is determined by the number of lobes in the stationary plate scanned per given time interval, knowing the angular velocity and the desired frequency to be generated one may determine the number of lobes needed on a given plate segment. It can readily be shown that the following relationship holds:

$$L=\frac{KF}{N}$$

where L is the number of lobes per plate segment, N is the number of digits transmitted per second, F is the frequency of the generated signal expressed in cycles per second and K is the fraction of time signals transmitted. For the arrangement shown in Fig. 1 each plate segment on the stationary disk 20 occupies 22½ degrees of arc and the empty space between said segments is likewise 22½ degrees. Seven digits plus a start signal are transmitted per cycle, hence N equals 8. Since the silent interval between digits is equal to the intervals during which signals are transmitted, K equals ½. Substituting in the above formula the calculated values of L are as follows:

| Plate Segments | K (cycles per second) | L (lobes per segment) |
|---|---|---|
| $AS_1$, $BS_1$, etc | 1,700 | 106¼ |
| $AS_2$, $BS_2$, etc | 1,500 | 93¾ |
| $AS_3$, $BS_3$, etc | 1,300 | 81¼ |
| $AS_4$, $BS_4$, etc | 1,100 | 68¾ |
| 23, $AS_5$, $BS_5$, etc | 900 | 56¼ |
| 24 | 700 | 43¾ |
| 25 | 200 | 12½ |

As the rotating scanning plate R passes over an energized code segment plate current is transmitted through the condenser formed by these plates, through the condenser formed by the hub capacitor plates 33 and 22, and through conductor 35 to the grid of vacuum tube amplifier $T_1$. Each complete revolution of disk 30 effects the successive transmission of a start signal pulse, seven-digit signal pulses, each of which comprises the combination of two superimposed frequencies, and a test signal pulse which is generated simultaneously with each digit pulse and with the start signal pulse. These pulses of superimposed frequencies are transmitted through amplifier $T_1$, transformer 50 and line L to a distant signal receiver.

In addition to the transmission circuit there is also shown in Fig. 1 a test signal circuit coupled to the output of amplifier $T_1$ through condenser $C_1$. Output pulses from $T_1$ are transmitted through amplifier $T_2$ and the parallel resonant circuit $L_2C_2$, tuned to a frequency of 200 cycles per second which represents the frequency generated by the test signal plates 25. The voltage taken across inductance $L_2$ in turn controls the current flow through varistors $V_1$ and $V_2$ and relay winding 40. The make and break of the relay actuates any desired type of test device in a manner to indicate the proper operation of the scanner. If for some reason the scanner should fail to generate signals this condition will be indicated by the test device.

In Fig. 2 there is shown an alternate arrangement of the electrode structure of the stationary plate and of the corresponding digit register. Stationary disk 20' carries on its surface seven-digit storage capacitor plates, the envelopes of which form concentric arcs covering 315 degrees of the circle, the 315 degrees being purely arbitrary and by no means critical. In this arrangement only one digit can be stored on the plates at one time. In order to transmit a seven-digit item of information, together with a start signal, it is necessary that the rotating scanner make eight complete revolutions. The speed at which the scanner will be revolved depends primarily upon the speed at which successive digits can be stored on the stationary plate by the relay operating contacts, but for purposes of illustration a speed of twenty cycles per second will be assumed. In the relationship $$L=\frac{KF}{N}$$

N=20, K becomes ⅞ and the calculated values of L are as follows:

| Plate Segments | K (cycles per second) | L (lobes per segment) |
|---|---|---|
| $XF_1$ | 1,700 | 74⅜ |
| $XF_2$ | 1,500 | 65⅝ |
| $XF_3$ | 1,300 | 56⅞ |
| $XF_4$ | 1,100 | 48⅛ |
| $XF_5$ | 900 | 39⅜ |
| $XF_6$ | 700 | 30⅝ |
| $XF_7$ | 200 | 8¾ |

In the above description all defined values have been arbitrarily chosen to illustrate particular embodiments of the invention. The same is true with regard to the number of digits transmitted and the particular code employed. As to the capacitor plate arrangement it should be obvious that the lobe structure of the stationary disk could be placed on the rotating disk with the segment structure of the rotating disk being placed on the stationary disk, or any combination thereof could be employed. It should also be apparent that other modifications could easily be made by those skilled in the art without departing from the scope of the present invention.

What is claimed is:

1. A device for generating alternating-current waves representing signal impulses comprising a stationary plate of electrically conducting material, means for applying a direct-current voltage to said stationary plate, a second scanning plate of electrically conducting material scannably movable past said stationary plate to form an electrical condenser therewith, one of said plates formed in a shape essentially that of a section of a wave modulated by a sine wave, the other plate consisting of a plurality of thin electrically connected segments with spacing between said segments equal to the spacing between the lobes of said first plate, said individual segments being progressively narrower from the middle to the ends of the group to effect a desired build up and decay of said generated signal impulse waves, and output means connected in series with said movable condenser for transmitting an alternating-current signal impulse each time said movable conductor scans said stationary conductor provided direct-current signal voltage is then being applied to said stationary conductor.

2. A wave transmitting arrangement comprising insulatedly mounted conductive bodies having relatively elongated surfaces whose cross-sections generally at right angles to their length vary in sinusoidal manners individual to each body, the lobes of said sinusoidal variation being progressively larger in amplitude from the ends toward the middle of said body, other insulatedly mounted conductive bodies having extended surfaces mounted to move in a plane generally parallel to the surface and in the direction of the length of said first-named bodies and closely adjacent and parallel thereto, the surface of said other bodies being relatively narrow in the direction corresponding to the length of said first-named bodies and long in the direction transverse thereto, said other bodies being conductively connected to each other and transmissively connected to an outgoing line, means for applying unidirectional voltages to selected ones of said first-named bodies in a code-wise manner, and means whereby said second-named bodies are caused to execute their motion at a relatively constant rate of speed whereby the sinusoidal variation of cross-section of said first-named bodies is translated into voltages of wave forms corresponding to their cross-sections and to frequencies proportional to their respective rates of speed.

3. An arrangement in accordance with claim 2 wherein the coupling of said second-named bodies to said line comprises a conductive surface fixed with respect to said first-named bodies and a conductive surface movable with respect to said second-named bodies, said conductive surfaces comprising a condenser of substantially fixed and invariable capacity which is independent of the movement of said second-named bodies.

4. A combination, a plurality of variable settable digit registers, a source of direct-current voltage, a motor-driven capacitive commutator comprising groups of fixed plates formed of electrically conducting material, scanning plates formed of electrically conducting material continuously rotating past said fixed plates, said fixed plates and said scanning plates being relatively shaped whereby the transverse projection of each stationary one upon its scanning mate varies sinusoidally with the area of successive lobes of said sinusoidal variation increasing from a minimum to a maximum and decreasing from said maximum back to said minimum as said scanning plates move past said fixed plates, said registers being variably settable independently of the relative positions of said plates to apply voltages selectively to certain said fixed plates and no voltages to others of said fixed plates, each of said registers being connected to a different radially adjacent group of said fixed plates whereby said scanning plates pass by said fixed plate groups in succession, all of said scanning plates being electrically transmissively connected to an output line, one or more supplemental plates situated between two of said groups of fixed plates, means for invariably applying a voltage from said source to said supplemental plates incident to any selective setting of said registers, said supplemental plates being radially positioned to be scanned also by certain of said scanning plates to impress upon said output line start pulse wave groups to characterize the digital positional significance of pulse wave groups impressed upon said line incident to the scanning of said first-named plates by said scanning plates.

5. An arrangement in accordance with claim 4, wherein said one or more supplemental plates between two of said groups of fixed plates vary in width in a sinusoidal manner, the lobes of said sinusoidal variation being progressively larger in amplitude from the ends toward the middle of said supplemental plates.

6. A combination, a plurality of variable settable digit registers, a source of direct-current voltage, a motor-driven capacitive commutator comprising groups of fixed plates formed of electrically conducting material, scanning plates formed of electrically conducting material continuously rotating past said fixed plates, said fixed plates and said scanning plates being relatively shaped whereby the transverse projection of each stationary one upon its scanning mate varies sinusoidally with the area of successive lobes of said sinusoidal variation increasing from a minimum to a maximum and decreasing from said maximum back to said minimum as said scanning plates move past said fixed plates, said registers being variably settable independently of the relative positions of said plates to apply voltages selectively to certain said fixed plates and no voltages to others of said fixed plates, each of said registers being connected to a different radially adjacent group of said fixed plates whereby said scanning plates pass by said fixed plate groups in succession, all of said scanning plates being electrically transmissively connected to an output line, other plates radially placed with respect to at least certain of said groups of fixed plates with oppositely located scanning plates movable with said first-named scanning plates, means for applying constant fixed unidirectional voltages from said source to said other plates, said other plates being electrically transmissively connected to said output line for sending predetermined test waves of predetermined frequency characteristics other than the frequencies sent by said plates connected to said registers, means selectively receptive of said test waves and means controlled thereby to indicate continued correct operation and electrical continuity of said first-named fixed and scanning plates and their connections to said voltage source and said line.

7. An arrangement in accordance with claim 6, wherein said other plates have a sinusoidal variation in width along their circumferential axis, the lobes of said variation being progressively larger in amplitude from the ends toward the middle of said other plates.

8. A combination, a plurality of variable settable digit registers, a source of direct-current voltage, a motor-driven capacitive commutator comprising groups of fixed plates formed of electrically conducting material, each of said fixed plates having a sinusoidal variation in width tapering from the middle towards its ends, scanning plates formed of electrically conducting material continuously rotating past said fixed plates, said fixed plates and said scanning plates being relatively shaped whereby the transverse projection of each stationary one upon its scanning mate varies sinusoidally with the area of successive lobes of said sinusoidal variation increasing from a minimum to a maximum and decreasing from said maximum back to said minimum as said scanning plates move past said fixed plates, said registers being variably settable independently of the relative positions of said plates to apply voltages selectively to certain said fixed plates and no voltages to others of said fixed plates, each of said registers being connected to a different radially adjacent group of said fixed plates whereby said scanning plates pass by said fixed plate groups in succession, all of said scanning plates being electrically transmissively connected to an output line.

9. A combination, a plurality of variable settable digit registers, a source of direct-current voltage, a motor-driven capacitive commutator comprising groups of fixed plates formed of electrically conducting material, each of said fixed plates having a sinusoidal variation in width tapering from the middle towards its ends, scanning plates formed of electrically conducting material continuously rotating past said fixed plates, each of said scanning plates comprising several conductively connected elements narrow circumferentially and wide radially and spaced apart center-to-center circumferentially a distance exactly equal to the lobe-to-lobe dimension of the sinusoidal variation in width of said fixed plate or plates scanned thereby, said fixed plates and said scanning plates being relatively shaped whereby the transverse projection of each stationary one upon its scanning mate varies sinusoidally with the area of successive lobes of said sinusoidal variation increasing from a minimum to a maximum and decreasing from said maximum back to said minimum as said scanning plates move past said fixed plates, said registers being variably settable independently of the relative positions of said plates to apply voltages selectively to certain said fixed plates and no voltages to others of said fixed plates, each of said registers being connected to a different radially adjacent group of said fixed plates whereby said scanning plates pass by said fixed plate groups in succession, all of said scanning plates being electrically transmissively connected to an output line.

10. Arrangement in accordance with claim 9 wherein the central elements of a group of connected elements are wider than the circumferentially placed end elements.

11. A combination, a plurality of variable settable digit registers, a source of direct-current voltage, a motor-driven capacitive commutator comprising groups of fixed plates formed of electrically conducting material, each of said fixed plates having a sinusoidal variation in width tapering from the middle towards its ends, scanning plates formed of electrically conducting material continuously rotating past said fixed plates, each of said scanning plates comprising several conductively connected elements narrow circumferentially and wide radially and spaced apart center-to-center circumferentially a distance exactly equal to the lobe-to-lobe dimension of the sinusoidal variation in width of said fixed plate or plates scanned thereby, each of said scanning plates including direct-current component central portions tapered to increase gradually in axial width for a distance large as compared with the lobe-to-lobe dimension of its scanned plate to a maximum near a radially wide but circumferentially narrow part of its scanning plate and decreasing in width near the circumferentially located center thereof, said fixed plates and said scanning plates being relatively shaped whereby the transverse projection of each stationary one upon its scanning mate varies sinusoidally with the area of successive lobes of said sinusoidal variation increasing from a minimum to a maximum and decreasing from said maximum back to said minimum as said scanning plates move past said fixed plates, said registers being variably settable independently of the relative positions of said plates to apply voltages selectively to certain said fixed plates and no voltages to others of said fixed plates, each of said registers being connected to a different radially adjacent group of said fixed plates whereby said scanning plates pass by said fixed plate groups in succession, all of said scanning plates being electrically transmissively connected to an output line.

12. An element adapted for use in a capacitive scanner comprising, a plurality of elongated conductive segments parallel to each other and spaced apart an equal distance center-to-center, each of said segments having dimensions narrow in width and relatively long in length, the width of said segments being progressively wider from the parallel located end segments toward the parallel located at center segments, and a conductive member for electrically interconnecting said plurality of segments at the centers thereof, said conductive member having a dimension long in the direction of the width of each of said plurality of segments and narrow in the direction of the length in each of said plurality of segments.

13. A capacitor plate adapted for use in a capacitive scanner comprising, a disk of insulating material, a plurality of conductive segments circumferentially mounted on a portion of said disk, said segments having dimensions narrow in the circumferential direction thereof and wide in the radial direction thereof and spaced apart circumferentially an equal distance center-to-center, the circumferential width of said segments being progressively narrower from the centrally placed segments to the circumferentially placed end segments, and a connective conducting segment mounted circumferentially on said disk to electrically interconnect each of said plurality of segments at the centers thereof, said conductive segment having dimensions narrow in the radial direction thereof and wide in the circumferential direction thereof and extending past both the end segments of said plurality of segments in the circumferential direction, said connective segment also being tapered to increase gradually in radial width for a distance large as compared with the center-to-center dimension between said plurality of segments to a maximum near the circumferentially placed end segments and decreasing in width to a minimum at the circumferentially located center thereof.

14. An element adapted for use in a capacitive scanner comprising, a conductive body varied in width along its length according to a sine variation of distinctive wave frequency, the lobes of said sine variation being progressively larger in amplitude from the ends toward the middle of said body.

15. A capacitor plate adapted for use in a capacitive scanner comprising, a disk of insulating material, an elongated conductive body circumferentially mounted on a portion of said disk, said body having dimensions long in the circumferential direction thereof and relatively narrow in the radial direction thereof, the width of said body varying along its length according to a sine variation of distinctive wave frequency, the lobes of said sine variation being progressively smaller in amplitude from the central portion of said body toward the circumferentially located ends thereof.

References Cited in the file of this patent

UNITED STATES PATENTS

| | | |
|---|---|---|
| 1,930,525 | Levy | Oct. 17, 1933 |
| 2,032,044 | Bourn | Feb. 25, 1936 |
| 2,147,948 | Kent et al. | Feb. 21, 1939 |